Feb. 10, 1953    C. H. SCULLIN    2,628,328

HIGH POWER TUBE BLOCKING CONDENSER

Filed Dec. 22, 1950

INVENTOR
C. H. SCULLIN.
BY
ATTORNEY

Patented Feb. 10, 1953

2,628,328

UNITED STATES PATENT OFFICE 2,628,328

HIGH POWER TUBE BLOCKING CONDENSER

Carl H. Scullin, Florham Park, N. J., assignor to Westinghouse Electric Corporation, East Pittsburgh, Pa., a corporation of Pennsylvania Application December 22, 1950, Serial No. 202,287

6 Claims. (Cl. 315—58)

This invention relates to electron discharge devices and more particularly to anode circuit blocking condensers as employed therein.

In high power, high frequency oscillator and amplifier circuits, it is difficult to find a suitable condenser, commonly called a blocking condenser, for use in the anode circuit of the amplifier or oscillator tube for the purpose of separating the direct current and radio frequency alternating current components. At the higher frequencies, for instance 10 megacycles/sec., and higher, this blocking condenser must carry the alternating current components of the plate current and in addition the displacement currents which flow through the output capacitance of the tube and socket. These currents, well known in the art, represent the amount of electricity moved in an insulator when there is a voltage difference impressed upon opposite sides of the insulator and at the frequencies under consideration are, for example, twenty to thirty amperes or more in magnitude. At the same time, the blocking condenser must withstand the alternating current voltage drop across the condenser due to the above mentioned displacement currents flowing through it. In addition, the blocking condenser must also resist the direct current plate supply voltage without breaking down across the dielectric.

For a given alternating current voltage as the frequency increases the reactance of the blocking condenser decreases and the displacement currents through the condenser increase in magnitude in direct proportion to the frequency increase. Also at radio frequencies, the resistance of the condenser due to the skin effect on the surface of the condenser increases with increase of frequency. Thus the internal losses in materials, such as mica, commonly used in condensers, increases also as the frequency increases. This combination of high displacement current and increased condenser resistance at the radio frequencies produces relatively high heating and renders the usual commercial condenser unsatisfactory in operation. Another defect of the commercial condenser employing mica as dielectric is the large internal inductance.

Hence it has been found advantageous, according to this invention, to replace the conventional blocking condenser in the anode circuit by a complete capacitor or built-in blocking condenser within the tube which can withstand the high voltages, carry the high radio frequency currents without excessive heating, and has a low internal inductance. The electrical conductors of the capacitor are the anode of the tube itself and a condenser plate assembly, insulated from each other by the tube vacuum. Such a condenser plate assembly may consist of a set of one or more metallic condenser plates joined together electrically and supported rigidly by a frusto-conical support plate, in close proximity to the anode on the vacuum side of the tube, said plate having appropriate portions or flanges transverse to the frusto-conical portion. This support plate is insulated from the anode by a glass bulb sealed to the anode and to the support plate near the outer periphery of said plate and provides a short-low-inductance electrical connection to the condenser plates from an external circuit, such as a plate-tank circuit. The vacuum within the tube provides the necessary no-loss dielectric medium and adequate electrical insulation between the condenser plates and the anode.

In its general aspect the present invention has the objective of overcoming the defects of the prior art blocking condensers in the anode circuit of an amplifier or oscillator tube.

Specifically, an object of the present invention is to provide a complete capacitor within an electron discharge device capable of resisting the high direct current voltages impressed on the anode.

Another and specific object of the present invention is a complete capacitor within an electron discharge device which can carry the high frequency displacement currents which flow through the output capacitance of said discharge device.

A further object of the present invention is a complete capacitor within an electron discharge device which provides a low inductance electrical connection to an external circuit.

Again, an object of the present invention is a complete capacitor within an electron discharge device in close proximity to the anode which provides high voltage external insulation from the anode.

Other objects of the invention will appear to those skilled in the art to which it appertains as the description proceeds both by direct recitation thereof and by implication from the context.

Referring to the accompanying drawing, in which like numerals of reference indicate similar parts throughout the several views.

Figures 1, 2, 3:
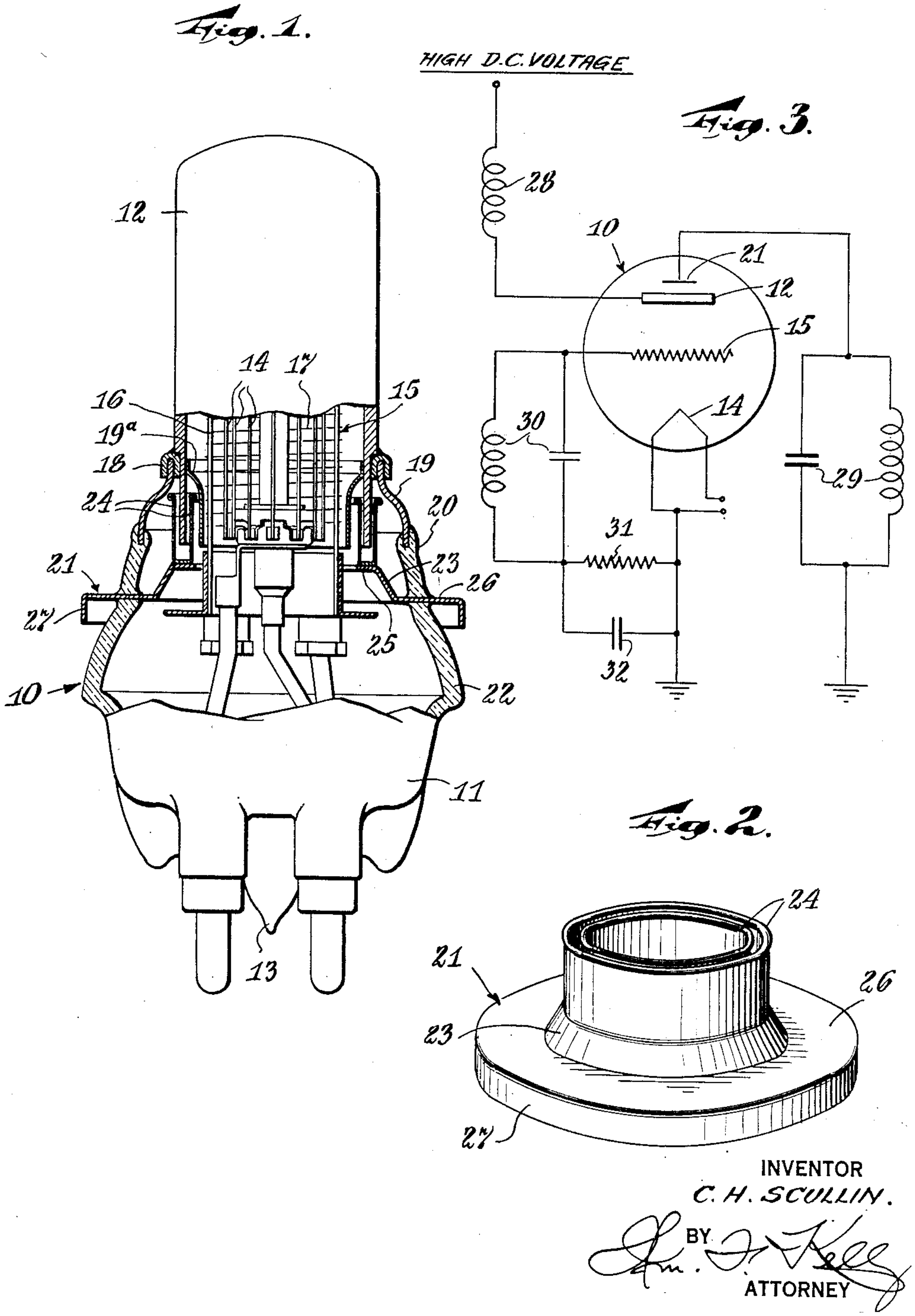
Fig. 1 is an elevational section of an electron discharge device and embodying the present invention.
Fig. 2 is a perspective view of the condenser plate assembly of the present invention.
Fig. 3 is a wiring diagram and showing the application of the device of the present invention in an amplifier circuit.

In the specific embodiment of the invention illustrated in said drawing, the reference numeral 10 designates an envelope in general of a triode electron discharge device. While a triode has been arbitrarily selected for illustrative purposes, the invention is not to be understood as restricted to employment with triodes only. Said envelope 10 is here shown as comprising a glass dish 11, constituting the base, with lead-in posts extending therefrom, a cylindrical metallic open-ended container 12, having a dome-like end portion, which also acts as an anode, and sealing means, in which the present invention inheres more particularly, between the dish and the anode in order that the envelope may be vacuum-tight. Evacuation is obtained by way of tubulation 13 which is sealed off when the desired vacuum is obtained in the device.

Within the envelope 10 and coaxial with the anode 12 is an annular series of filament wires 14 which constitute the cathode. Electrons are emitted from this cathode in use and, as usual, those electrons follow essentially radial straight-line paths to the anode. Between the cathode 14 and anode 12, coaxial to both, is a grid 15 comprised of a plurality of equally spaced parallel stays or support rods 16 having a circular grouping coaxial to the cathode and anode. Peripherally outwardly of the group of stays is a helix of grid wire 17, the several convolutions of which are spaced apart longitudinally of the stays. All of the convolutions contact the stays where they cross and are arc welded or otherwise secured thereat to the stays.

Said anode 12 is advantageously made of copper, thereby having the advantage of that metal for ease in shaping the anode and for the high electrical conductivity afforded thereby. The wall of the anode near its open end is uniformly thinned from the outside a suitable distance from said open end. Joined, as by brazing, to the anode wall at the shoulder formed by the wall and the thinned portion thereof is an annular collar 18, shown as a metallic ring having an inverted U-shaped cross section. The smaller end of a frusto-bell-shaped sealing ring 19 is located in collar 18 and attached thereto, as by brazing, and is suitably "Kovar"; "Kovar" is the trade name for a metal alloy comprising primarily nickel, cobalt and iron as described in U. S. Patent No. 2,062,335.

A metallic frusto-bell-shaped internal ring shield 19A, of length approximately that of ring 19, is joined as by brazing at its larger end to the inner surface of the anode wall so that the smaller end of said shield 19A is suitably flush with the open end of said anode. Said shield 19A protects the blocking condenser plate and support assembly 21 from electrons emitted by the cathode 14 and from the anode direct current high voltage. Further, shield 19A adds to the total capacitance of the complete capacitor. Said ring 19 flares axially outwardly toward dish 11 and is connected through appropriate vacuum-tight seals by a suitable borosilicate glass bulb 20 to the upper surface of the condenser plate and support assembly 21. In turn, the bottom surface of condenser plate and support assembly 21 is united hermetically with glass dish 11 by a similar borosilicate glass bulb 22, thereby completing the means for joining anode 12 and dish 11 to retain the desired vacuum.

Said condenser plate and support assembly 21 comprises a metallic frusto-conical support 23, preferably "Kovar" and two copper condenser plates 24, which in this showing, are parallel cylinders in close proximity to and concentric with the anode 12. The support 23 has a horizontal washer-like mounting flange 25 projecting radially inwardly from the top of said frusto-conical portion and has a horizontal washer-like sealing flange 26 projecting radially outwardly from the bottom of said portion. At the periphery of sealing flange 26 a rim 27 depends below the general under plate of said flange 26. Said mounting flange 25 supports and juxtaposes condenser plates 24 at opposite sides of the wall of anode 12, at its open end, so that in this case, the wall of the anode and sealing ring 19 form, with the two condenser plates 24, the upper and the lower set of electrical conductors respectively of a complete capacitor within the electron discharge device. Said sealing flange 26 is sealed a suitable distance radially inwardly from its periphery to glass bulbs 20 and 22, to permit the use of rim 27 as an outwardly projecting connection for coupling the anode and the capacitor to the external circuit, such as a plate-tank circuit as shown in Fig. 3. The dielectric between condenser plates 24 and the wall of anode and sealing ring 19 is the vacuum within the electron discharge device. Sealing ring 19 is suitably insulated from sealing flange 26 of condenser plate and support assembly 21 by bulb 20.

According to my invention, an electron discharge device containing the above-described complete capacitor within said device may be used in a circuit as shown in Fig. 3. A high direct current voltage is connected to the anode 12 through a suitable choke 28. The anode 12, sealing ring 19, and internal shield 19A and the condenser plates 24 of condenser plate and support assembly 21 form a built-in complete capacitor or blocking condenser within said device. High voltage insulation between the above mentioned electrical conductors is provided along the envelope by glass bulb 20 between ring 19 and sealing flange 26 and by the vacuum dielectric between anode 12 and ring 19 and condenser plates 24. Said vacuum of the device provides a necessary low loss dielectric medium and consequential relatively low heating in the capacitor when displacement currents flow through said complete capacitor. The rim 27 of sealing flange 26 provides a short low inductance connection to a plate tank circuit 29 which in turn is connected to ground. An appropriate grid tank circuit 30, with necessary grid leak resistor 31 and grid by-pass condenser 32 drive the grid and complete a conventional shunt fed amplifier circuit. In the usual manner the cathode 14 is tied electrically to the above mentioned grid tank circuit 30, by means of resistor 31 and condenser 32 and also to ground.

Thus it will be seen from the foregoing description that my invention has overcome the defects of the prior art blocking condensers in the anode circuit of an amplifier or oscillator tube. I have provided a complete capacitor or built-in blocking condenser within an electron discharge device which is capable of resisting the high direct current voltages impressed on the anode 12. Said complete capacitor comprises the wall of anode 12, sealing ring 19, and shield 19A as one set of electrical conductors and condenser plates 24 as the other set of electrical conductors separated by the tube vacuum as a dielectric. Due to the low loss vacuum dielectric, said complete capacitor can carry high frequency displacement currents with relatively low heating. The rim 27 of sealing flange 26 provides a low inductance electrical connection, extending outwardly from the tube envelope 10, to an external circuit. Again glass bulb 20 provides adequate high voltage insulation of condenser plates 24 from sealing ring 19 and of course in turn from anode 12.

Although a preferred embodiment of my invention has been disclosed, it will be understood that modifications may be made within the spirit and scope of the appended claims.

I claim:

1. An electron discharge device comprising an anode and a built-in blocking condenser, said condenser having said anode as one electrical conductor, a condenser plate within said device in close proximity to said anode as the other electrical conductor, and a frusto-conical support plate within said device for mounting said condenser plate, said support plate having a washer-like mounting flange projecting radially inwardly from the top of said support plate and a washer-like sealing flange projecting radially outwardly from the bottom of said plate through the envelopen of said device.

2. An electron discharge device comprising an anode and a built-in blocking condenser, said condenser having an upper electrical conductor, a lower electrical conductor, and a low loss vacuum of said device as a dielectric, said lower electrical conductor having a condenser plate of electrically conducting metal in close proximity to said anode, said condenser plate joined electrically to and supported rigidly on a horizontal washer-like mounting flange projecting radially inwardly from the top of a frusto-conical support plate, said support plate having a horizontal washer-like sealing flange projecting radially outwardly from the bottom of said plate through the envelope of said device, said upper electrical conductor comprising said anode.

3. An electron discharge device comprising a hollow cylindrical dome-shape anode of electrically conducting metal, and a built-in blocking condenser, said condenser having an upper electrical conductor, a lower electrical conductor, and a low loss vacuum of said device as a dielectric, said lower electrical conductor having a cylindrical condenser plate of electrically conducting metal concentric with said anode and at opposite sides of the wall of said anode, said condenser plate joined together electrically by and supported rigidly on a horizontal washer-like mounting flange projecting radially inwardly from the top of a frusto-conical support plate, said support plate having a horizontal washer-like sealing flange projecting radially outwardly from the bottom of said plate through the envelope of said device, said upper electrical conductor comprising the lower portion of the wall of said anode near its open end.

4. An electron discharge device comprising a hollow cylindrical dome-shaped anode of electrically conducting metal, and a built-in blocking condenser, said condenser having an upper set of electrical conductors, a lower set of electrical conductors, and a low-loss vacuum of said device as a dielectric, said lower set of electrical conductors having a plurality of cylindrical condenser plates of electrically conducting metal concentric with said anode, said condenser plates joined together electrically by and supported on a horizontal washer-like mounting flange projecting radially inwardly from the top of a frusto-conical support plate, said support plate having a horizontal washer-like sealing flange projecting radially outwardly from the bottom of said plate through the envelope of said device, said upper set of electrical conductors comprising the lower portion of the wall of said anode near its open end, a frusto-bell-shaped sealing ring of electrically conducting metal joined at its smaller end to the outer surface of said portion of said wall and projecting at its larger end axially outwardly from said anode, and a frusto-bell-shaped internal ring shield of electrically conducting metal joined at its larger end to the inner surface of said portion of said wall and projecting at its smaller end axially inwardly from said anode.

5. An electron discharge device comprising a hollow cylindrical dome-shape anode of electrically conducting metal, and a built-in blocking condenser, said condenser having an upper set of electrical conductors, a lower set of electrical conductors, and a low loss vacuum of said device as a dielectric, said lower set of electrical conductors having two cylindrical condenser plates of electrically conducting metal concentric with said anode and at opposite sides of the wall of said anode, said condenser plates joined together electrically by and supported rigidly on a horizontal washer-like mounting flange projecting radially inwardly from the top of a frusto-conical support plate, said support plate having a horizontal washer-like sealing flange projecting radially outwardly from the bottom of said plate through the envelope of said device, said upper set of electrical conductors comprising the lower portion of the wall of said anode near its open end, a frusto-bell-shaped sealing ring of electrically conducting metal joined at its smaller end to the outer surface of said portion of said wall and projecting at its larger end axially outwardly from said anode, and a frusto-bell-shaped internal ring shield of electrically conducting metal joined at its larger end to the inner surface of said portion of said wall and projecting at its smaller end axially inwardly from said anode.

6. An electron discharge device comprising a hollow cylindrical dome shape anode of electrically conducting metal, and a built-in blocking condenser, said condenser having an upper set of electrical conductors, a lower set of electrical conductors, and a low loss vacuum of said device as a dielectric, said lower set of electrical conductors having two cylindrical condenser plates of electrically conducting metal concentric with said anode and at opposite sides of the wall of said anode, said condenser plates joined together electrically by and supported rigidly on a horizontal washer-like mounting flange projecting radially inwardly from the top of a frusto-conical support plate, said support plate having a horizontal washer-like sealing flange projecting radially outwardly from the bottom of said plate through the envelope of said devce, said upper set of electrical conductors comprising the lower portion of the wall of said anode near its open end, a frusto-bell-shaped sealing ring of electrically conducting metal joined at its smaller end to said portion of said wall and projecting at its larger end axially outwardly from said anode, and a frusto-bell-shaped internal ring shield of electrically conducting metal joined at its larger end to the inner surface of said portion of said wall and projecting at its smaller end axially inwardly from said anode said ring having a high voltage insulating glass bulb between the larger end of said ring and said sealing flange.

CARL H. SCULLIN.

REFERENCES CITED

The following references are of record in the file of this patent:

UNITED STATES PATENTS

| Number | Name | Date |
|---|---|---|
| 2,534,077 | Stevens | Dec. 12, 1950 |
| 2,554,877 | O'Neill et al. | May 29, 1951 |